May 1, 1962 G. T. W. GRIEVE 3,032,464
MANUFACTURE OF OIL-FILLED CABLES
Filed Oct. 28, 1957 6 Sheets-Sheet 1

Inventor
George Thomas Welson Grieve,
By
Attorneys

May 1, 1962   G. T. W. GRIEVE   3,032,464
MANUFACTURE OF OIL-FILLED CABLES
Filed Oct. 28, 1957   6 Sheets-Sheet 2

Inventor
George Thomas Wilson Grieve
By
Hooper, Leonard & Buell
Attorneys May 1, 1962 G. T. W. GRIEVE 3,032,464
MANUFACTURE OF OIL-FILLED CABLES
Filed Oct. 28, 1957 6 Sheets-Sheet 3

Inventor,
George Thomas Wilson Grieve
By
Hooper, Leonard & Buell
Attorney.

May 1, 1962 G. T. W. GRIEVE 3,032,464
MANUFACTURE OF OIL-FILLED CABLES
Filed Oct. 28, 1957 6 Sheets-Sheet 6

Inventor
George Thomas Wilson Grieve,
By
Hooper, Leonard & Bull,
Attorneys

United States Patent Office 3,032,464
Patented May 1, 1962

3,032,464
MANUFACTURE OF OIL-FILLED CABLES
George Thomas Wilson Grieve, Shooters Hill, London, England, assignor to British Insulated Callender's Cables Limited, London, England, a British company
Filed Oct. 28, 1957, Ser. No. 692,852
Claims priority, application Great Britain Oct. 31, 1956
4 Claims. (Cl. 156—382)

This invention relates to the manufacture of oil-filled electric cables. In the manufacture of such cables it is the practice to dry the paper insulated conductor (or conductors) before applying a metal sheath thereto, then to apply the sheath and thereafter to evacuate the sheathed, insulated conductor (or conductors) to impregnate the sheathed insulated conductor (or conductors) with a low viscosity oil. In the case of aluminium sheathed cables, sheathing is usually effected by drawing the dried core, or cores, into a laid out length of aluminium tubing and thereafter reducing the cross section of the tubing by pulling it through a drawing die, or dies, or otherwise, to make it a close fit on the cable core or group of cores. The entire operation of manufacture is protracted, the evacuation and impregnation stages being very long owing to the difficulty of obtaining a high degree of vacuum throughout the cable length.

By this invention I provide an improved method of manufacture of aluminium sheathed oil-filled cable which shortens the time of manufacture and facilitates the evacuation and impregnation of the cable, and improved apparatus for carrying out such improved method of manufacture.

In accordance with my invention my improved method of manufacture of aluminium sheathed oil-filled cable comprises drying and evacuating a cable core and the interior of a length of aluminium tubing and, whilst maintaining the vacuum on both the core and the tubing, drawing the evacuated core into the evacuated tubing, operating upon the tubing by a drawing, rolling or folding process to reduce its cross-section without breaking the vacuum on the tubing and thereafter admitting oil to the interior of the evacuated sheathed cable to effect its impregnation. Here and hereinafter where the context permits the word "paper" is used to include also other suitable oil-permeable fibrous insulation, for example, woven or felted tapes of other fibrous insulating material and the term "aluminium" is used to include other suitable metals or alloys possessing the necessary ductility, for example, copper, brass and steel.

The improved method has the advantage of reduced handling, as compared with that involved in carrying out existing methods of manufacture, in which the core has to be dried, taken from the drier, drawn into a tube and the tube reduced in diameter by drawing through a die, and the cable so formed coiled on a drum and removed to the impregnator where it has to be re-heated and evacuated through the ends of a close fitting sheath prior to the admission of oil to fill the spaces within the sheath and impregnate the paper insulation.

My improved apparatus for carrying out my improved method of manufacture essentially comprises a drying tank, having means within the tank for rotatably supporting a drum carrying the cable core (or a group of cores) to be dried, and in its peripheral wall an opening extending the full effective width of the drum. This opening is closed by a hood which tapers towards a relatively small mouth through which core can be drawn off the drum and out of the tank. The axis of this hood is preferably approximately tangential to the barrel of the drum or to a cylindrical surface having a diameter between that of the barrel and that of the flanges of the drum. At the mouth of the hood means are provided for making an airtight connection between the mouth and one end of a laid out length of aluminium tube. In using this apparatus as so far described the cable core on its drum is put into the tank which is then closed and one end of a laid-out length of tube containing a towline is coupled to the mouth of the hood. The far end of the tube is hermetically sealed. The core is then dried with the aid of heat and vacuum applied to the tank. When drying is complete the core is drawn off its drum and out of the tank into the tube. The tube is then reduced in cross-section and the oil is admitted through one end until impregnation is complete.

The initial length of the tube may be such that the whole of the core can be pulled into it before the tube is reduced in diameter by drawing through a die. It is preferred however to make the tube initially shorter than the core by the amount by which the length of the tube will increase due to the reduction of its diameter. In this case, the process of reducing the tube diameter begins after the leading end of the core has been drawn through the tube to its far end and while the trailing end of the core is still in the tank. The trailing end of the core is then automatically drawn into the tube as the length of the tube progressively increases.

Preferably the one end of the tube is connected to the mouth of the hood by a valve. Closure of this valve permits of the initial drying of the cable core being effected before coupling on the tube into which the completely dried core is to be pulled, but it entails making the connection between the trailing end of the tow line and the leading end of the cable or a short length of tow rope previously attached to it. This may be effected before coupling on the tube by opening the valve after having broken the vacuum in the tank by admitting dry air or gas. After coupling on the tube, which should first have been filled with dry air or gas, vacuum may then be reapplied. Alternatively initial drying of the cable core may be carried out in another drier which may be of normal construction and the cable core when partly dried may be transferred from that drier to my improved apparatus for final drying and evacuation.

In a modified arrangement which avoids the need to break the vacuum in the tank to permit the tow line to be coupled to the leading end of the dried cable core, that side of the valve on the mouth of the hood that is remote from the tank has a tapered bore closable by a correspondingly tapered plug. At its larger end this plug has a diameter less than the internal diameter of the tubing into which the core is to be drawn; at its smaller end its diameter and that of its seating are greater than that of the core. To the inner and smaller end of this plug is attached an insulating tow-rope connecting it to the cable. The outer and larger end of the plug is adapted for attachment to the tow-line by which the core is drawn into the tubing. With this arrangement with the valve open and the plug in position the cable core in the tank can be evacuated and dried before the tubing is laid out. After running out the tubing the end of the tow-line is coupled to the plug and the end of the tube jointed to the plug housing. The tubing is then evacuated and when the required degree of vacuum is reached, the tow-line is pulled sufficiently to extract the plug and equalize the vacuum after which the core may be hauled into the tubing, which is then drawn down before admitting oil.

The hermetic seal at the far end of the tube may be so constructed as to include means for hauling back the tow-line to pull the core (or group of cores) into the tube. In this case the seal is obtained by coupling the end of the tube to an opening in an otherwise vacuum-tight container housing a winch, preferably a hydraulically driven winch. Alternatively, the end of the tube may be fitted with a labyrinth type sealing gland through which the leading end of the tow-line passes out to a winch. To assist in making a vacuum-tight seal there may be used a tow-line having a smooth cylindrical surface free from re-entrant curves, for example a plastic covered tow-line or a rod made from glass fibre bonded with an oil-resistant resin.

After pulling the dried core, or group of dried cores, into the evacuated tube the tube is reduced in cross-section. This is preferably done by means of a sinking die which is caused to travel along the tube from the far end towards the end coupled to the drying tank. This movement may be effected by means of twin hawsers and a winch (hereinafter referred to as the inner winch), the hawsers being coupled to the die stand which is mounted on rollers. With this method of cross-sectional reduction of the tube, elongation results. Provision is made for this by a third winch whose function it is to pull back the far end of the tube and, where fitted, the tow-line winch and its hermetically sealed housing.

After the tube has been drawn down or otherwise reduced in cross-section, oil is admitted to fill the evacuated tube and impregnate the core (or cores). To avoid wastage of oil and the release the drying tank for further use, it is preferred to seal off the tube from the drying tank and from the container housing the tow-line winch, where such is present. The former is preferably done by coupling the tube to the drying tank through a slide valve, the slide of which forms or carries a cutter at its leading edge which co-operates with a mating shear plate in the valve chamber so that on closing the valve the trailing tow-rope extending back from the tube into the drying tank is severed. This valve is preferably hydraulically actuated. The tube may be sealed off from the tow-line winch container by a similar valve which on closing severs the leading tow-line. After closing, the one valve may be disconnected from the drying tank and the other from the winch container, and oil admitted through connections in one valve. The oil will usually be caused to flow through the cable and out through a connection in the other valve to ensure complete impregnation. After impregnation the cable, complete with the valves still coupled to it, is wound up on a take-up drum, and drum tanks connected to the cable as necessary.

The drying tank may be of vertical or horizontal form, the former being generally the more convenient. With a tank of vertical form, there is preferably provided in the base of the tank a turn-table on which the drum carrying the cable is supported with its axis coincident or approximately coincident with the axis of the table. Provision may be made for applying a drive and/or a braking torque to the table to facilitate drawing off the cable and preventing over-running, respectively. With a tank of this form the opening in its peripheral wall will be a vertical slot.

Drying of the core (or groups of cores) within the drying tank will generally be effected or at least assisted by passing electric current along the core conductor (or conductors). Connection to the two ends of each core conductor may be made by means of clamps which can be released automatically before the drum begins to rotate and pay out core. These clamps may be hydraulically actuated. One may be located in the mouth of the hood and serve also to hold the leading end of the core conductor in place while the trailing end of the tow-line is coupled to it, in cases where partial drying takes place before the aluminium tube is coupled to the drying tank. This coupling may be of a quick coupling type comprising two parts, one of which is previously secured to the outer end of the drummed insulated conductor and the other is previously secured to the trailing end of the tow-line.

The manufacture of an oil-filled aluminium sheathed cable in accordance with the invention will now be described by way of example and with reference to the accompanying drawings, wherein.

Figures 5, 7:
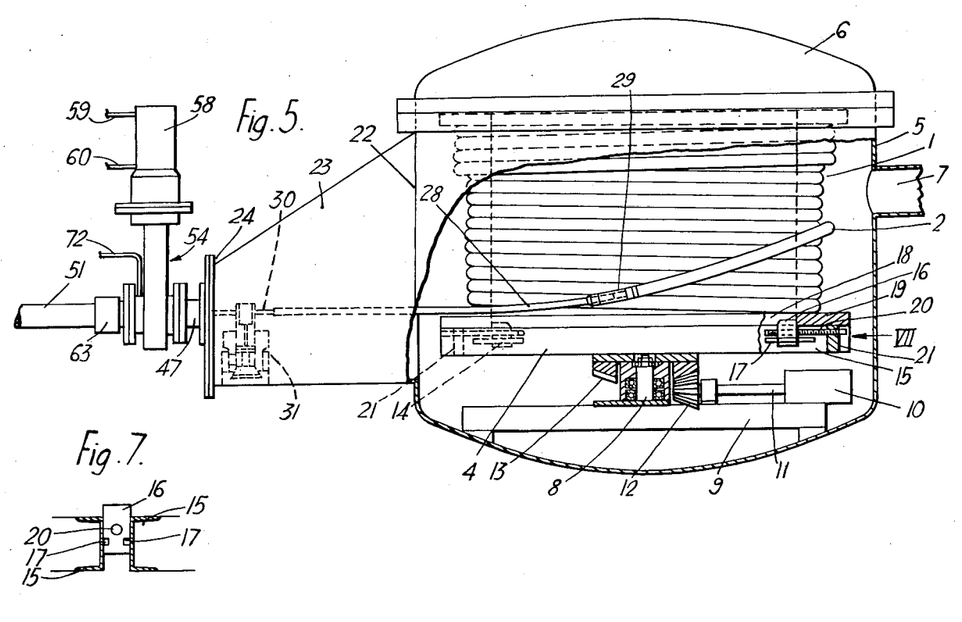
FIGURE 5 is a side elevation, partly in section, of the drying tank.
FIGURE 7 is a view of a detail of the tank as seen in the direction of the arrow VII in FIGURE 6.

A coil 1 of the cable core 2 which is to be sheathed is wound upon a drum 3 in the conventional manner and the drum is supported, with its axis vertical, on a table 4 in a cylindrical drying vessel 5. The table 4 is rotatable to permit the drum to turn on its axis as the core is drawn off. The drying vessel 5 is provided with a removable cover 6 which can be hermetically sealed and the vessel can be evacuated in the usual manner through a side outlet 7. The table 4 is mounted, by means of a central bearing 8, on a base 9 fixed to the floor of the drum. Also on the base 9 is mounted an oil pump 10 on the shaft 11 of which is fixed a bevel gear 12 which meshes with a second bevel gear 13 which is fixed to the underside of the table 4. A number of clamps 14 are provided to hold the drum 3 firmly on the table 4. The table 4 includes pairs of horizontal girders 15 (FIGURES 5 and 7). A clamp 14 is provided by a block 16 which is slidable horizontally between the two opposed vertical faces of one end of a pair of girders 15. Horizontal guides 17 are fixed to the girders 15 and engage within corresponding grooves in the sides of the block 16. The block 16 extends above the top of the table 4 into the central aperture 18 of the annular drum flange 19. When the drum 3 is in position on the table 4 each clamping block 16 can be drawn tightly against the inner periphery of the flange 19 by turning a horizontal screw-threaded rod 20, which makes screw-thread engagement with the block 16 and is held against longitudinal movement in a fixture 21 on the table. When the core 2 is drawn off the drum 3 the rotation of drum 3, with the table 4 to which it is fixed, is subject to a braking force exerted by the oil-pump 10 as this is driven by the rotating table 4 through the gears 13 and 12 and the shaft 11.

Figures 6, 11:
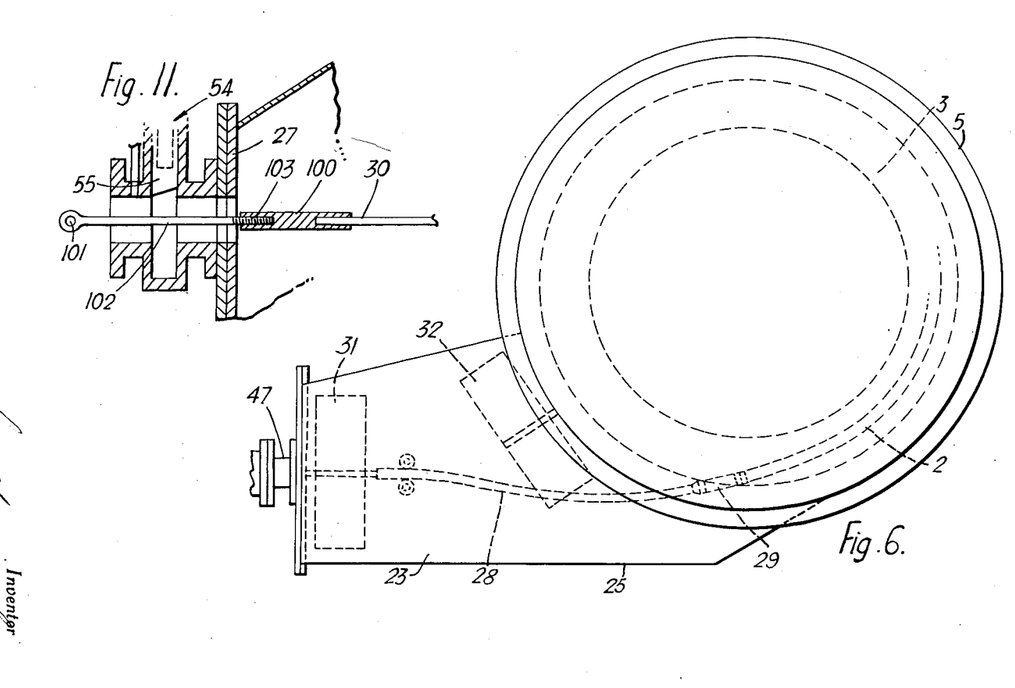
FIGURE 6 is a general plan view of the arrangement shown in FIGURE 5.
FIGURE 11 illustrates an alternative form of a detail of the apparatus.

In the vertical peripheral wall of the drying vessel 5 there is provided a slot 22 which extends over the full effective vertical width of the drum 3. This slot 22 is closed by a hood 23 which tapers away to a relatively small end 24 through which the core 2 can be drawn off the drum 3 and out of the vessel 5. As indicated in FIGURE 6, the axis of the hood 23 is approximately tangential to the barrel of the drum 3. As shown in FIGURE 6 the floor 25 of the hood 23 is horizontal so that the outlet is opposite the lower part of the vessel. The outlet itself (26) is formed within the vertical closure wall 27 of the hood 23.

Figure 9:
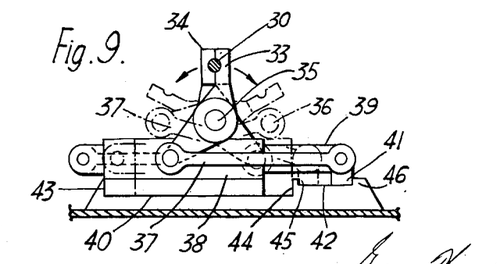
FIGURE 9 is a view of part of the arrangement shown in FIGURE 8 as seen in the direction of the arrow IX in that figure.

Provision is made for the heating of the core 2, for the purpose of drying, to be effected by passing electric current through the conductor or conductors. For this purpose an insulated tow-rope 28 is coupled to each end of the core 2 by means of a connector 29. The tow-rope 28 comprises a single conductor 30 enclosed by a layer of insulation which is stripped back from the free end of the conductor. The connector 29 provides a mechanical and electrical coupling between the conductor 30 and the conductor or conductors of the core 2 and it is also provided with a body of insulation which encloses the ends of the insulating coverings of the core 2 and insulated tow-rope 28. The overall diameter of the connector 29 does not exceed the diameter of the core 2. Mounted within the hood 23 are two hydraulically controllable conductive clamps 31 and 32 which serve to engage the free ends of the tow-line conductors 30. One clamp 31 is mounted close to the outlet 26 and serves to main the leading conductor end in alignment with the outlet 26. The other clamp 32 (FIGURE 6) is mounted in such a position close to the drum that it will engage the end of the trailing conductor and will not interfere with the passage of the core 2 through the hood 23. As indicated in FIGURE 9, the clamp 31 comprises two contact levers 33, 34 having recesses in the inner surfaces of their outer ends so that the conductor 30 can be gripped in those recesses when the outer ends of the levers are forced together. Intermediate their ends the levers 33, 34 are mounted for rocking movement about a common horizontal pivot 35. The inner ends of the levers 33, 34 are connected by pivotal links 36, 37 to a hydraulic drive comprising a cylinder 38 in which works a piston connected to a piston rod 39 extended through one end of the cylinder. One link 37 is connected to the end of the piston rod 39 and the other link 36 is connected to the cylinder 38. By the fluid pressure on one side of the piston in the cylinder 38, the ends of the links 36, 37 connected with the cylinder 38 and piston rod 39 are moved apart to bring the contacts 33 and 34 into clamping engagement with the conductor 30 as indicated in full line in FIGURE 9. The clamping pressure is released by moving the piston in the opposite direction. To maintain the central closing and opening position of the clamp, the cylinder 38 is mounted for movement relative to the piston. For this purpose the cylinder 38 is supported on a guide way 40 and the end of the piston rod 39 is mounted on a block 41 which is movable on a guide-way 42. To ensure the required relation between the movements of the cylinder 38 and piston rod 39, the limits of the movement are determined by abutments 43, 44 at the ends of one guide-way 40 and by abutments 45 and 46 at the ends of the other guide way 42. The clamp is controlled by means extending to the outside of the hood. Also flexible conducting leads are led through the wall of the hood to the clamping members 33 and 45 which are insulated from the hood by insulating means incorporated in one or more of the pivots. The other clamp 32 is identical with the above described clamp 31.

On the external face of the end closure wall 27 of the hood there is mounted an extension 47 having a circular section tapered bore of which the smaller end is nearest the hood. The bore is dimensioned to receive a tapered plug 48 to form a vacuum tight seal. The small end of the plug 48 is attached to the otherwise free end of the insulated tow-rope 28 by means of an externally screw threaded plug 49 which engages an internally threaded opening in this end of the main plug 48. The small plug 49 is formed with a central passage through which the end of the tow-rope conductor 30 is passed. The strands of the conductor are then splayed and gripped between complementary conical surfaces 50 on the two plugs. The outer plug 48 is made of insulating material and the inner plug 49 may be made of similar material. The insulant is a material, for instance a polythene compound, which has sufficient mechanical strength to transmit the tensile forces which are applied to draw the core 2 from the drying vessel and to resist the compression forces which exist when the vessel is evacuated, yet which is sufficiently plastic to enable the external diameter of the plug to be reduced by drawing it through a die without materially reducing the strength of the mechanical coupling between the plugs and the tow-rope conductor. An eye-bolt 64 is fixed to the larger end of the main plug 48. The smallest dimension of the bore in the extension 47 is slightly larger than the external diameter of the larger core 2 with which the apparatus is used. The largest dimension of the main plug 48 is slightly less than the smallest internal diameter of an aluminium tube 51 into which the core is to be drawn.

Figure 8:
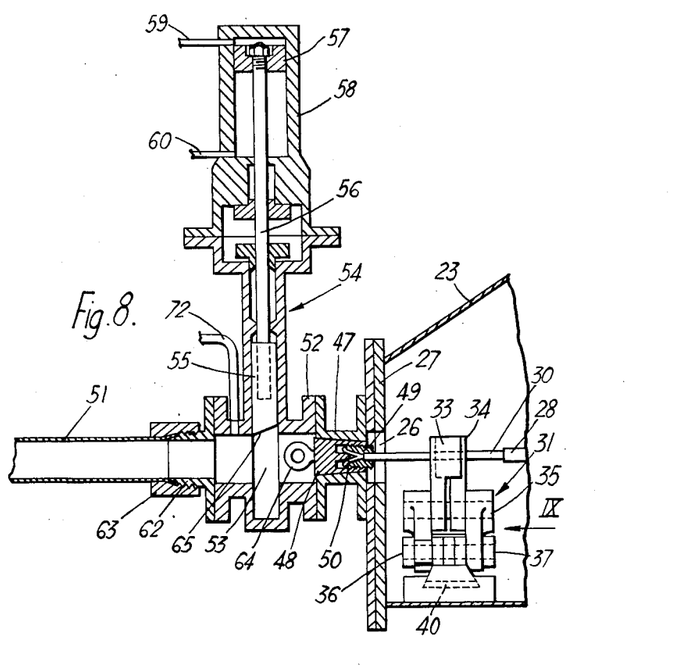
FIGURE 8 is a detail, in section and upon an enlarged scale, of FIGURE 5.

The outer end of the extension 47 is joined to one flange 52 of the passage 53 of a hydraulically operable gate-valve 54. The valve-slide 55, shown in the open position on FIGURE 8, is mounted on the end of a piston rod 56 which is connected to a piston 57 movable in a cylinder 58. Fluid under pressure is admissible to each end of the cylinder 58 through ports 59 and 60, the piston being raised to open the valve and lowered to close it. When closed, the valve provides a vacuum- and pressure-tight seal between the two parts of the passage 53. On the flange 61 at the outer end of the passage 53 is mounted a pipe-coupling comprising inner and outer tapered members 62 and 63 respectively which can be screwed together to grip between them and make a vacuum- and pressure-tight connection with the splayed end of the aluminum tube 51. The eye-bolt 64 on the tapered plug 48 is entirely disposed in the inner end of the passage 53 when the valve is closed. A port 72 in the wall of the other end of the passage 53 provides for the introduction of impregnating oil. As indicated in FIGURE 8, the lower end of the valve-slide 55 is formed with a cutting edge 65.

Figure 10:
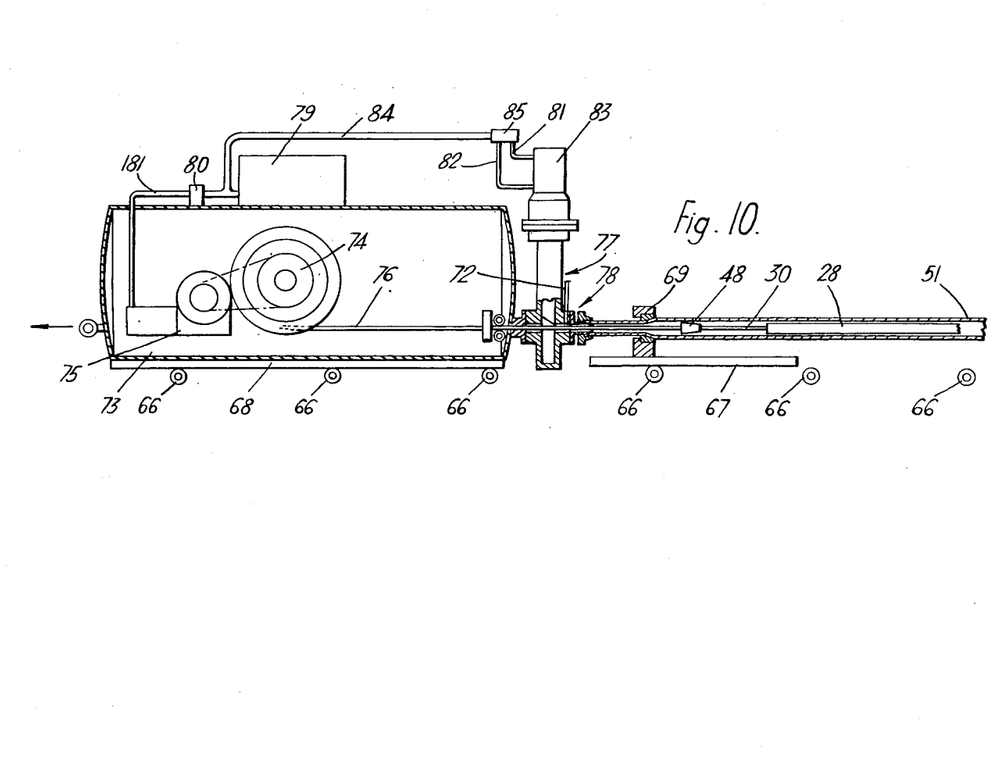
FIGURE 10 represents in section the arrangements for dealing with the end of the sheath which is remote from the drying tank.

Extending away from the drying vessel 5 there is a track, represented by rollers 66 in FIGURE 10, on which are mounted, for movement towards and away from the vessel, a die-carriage 67 and a winch-housing-carriage 68. Mounted on the first mentioned carriage 67 is a reducing die 69. The die-carriage 67 can be drawn towards the drying-vessel by means of an inner winch 71, stationarily mounted near the drying vessel, which serves to wind two hawsers 70, connected on to each side of the die-carriage 67. The other carriage 68 supports a housing 73 for a tow-line winch 74 and its hydraulic motor 75. The tow-line winch 74 accommodates a tow-line 76 which can be led from the housing through a hydraulically operated cutting valve 77 which is substantially identical with the other valve 54 (already described). Also, on the outside of the valve 77 there is provided a pipe coupling 78 for engaging the leading end of the aluminium tube 51 in the same manner as the pipe coupling members 62, 63 which are associated with the other valve 54. The housing 73 is a vacuum- and pressure-tight container. An electrically driven hydraulic pump 79 is mounted on top of the housing 73 and feeds the hydraulic winch motor 75 through a controller 80 and a pipe 181. The pump 79 also supplies fluid to the ports 81 and 82 of the cylinder 83 of the cutting valve 77 through a pipe 84 and a controller 85. At the extreme outer end of the roller track 66 is stationarily mounted an outer winch 86 which serves to draw the housing 73 along the track by means of an outer hawser 87 fastened at its inner end to an eye-bolt on the housing 73 or on its carriage 68.

Figure 1:
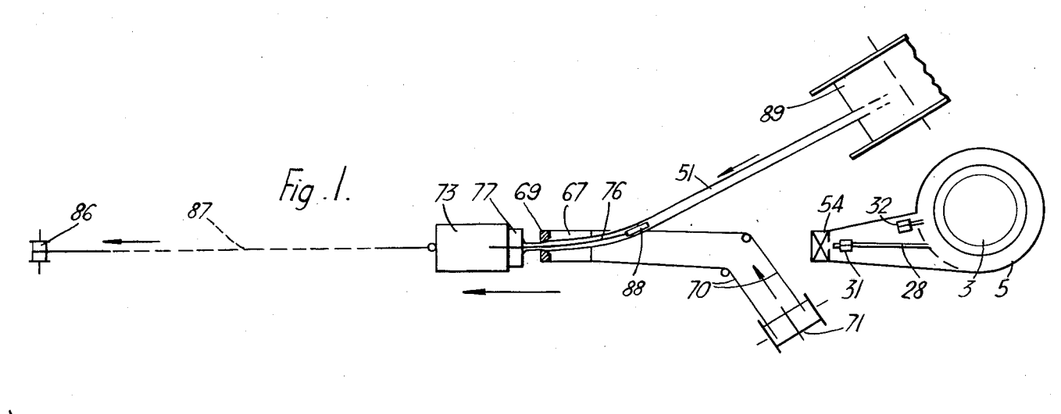
FIGURES 1 to 4 represent diagrammatically five successive stages of the operation.
Figure 2:
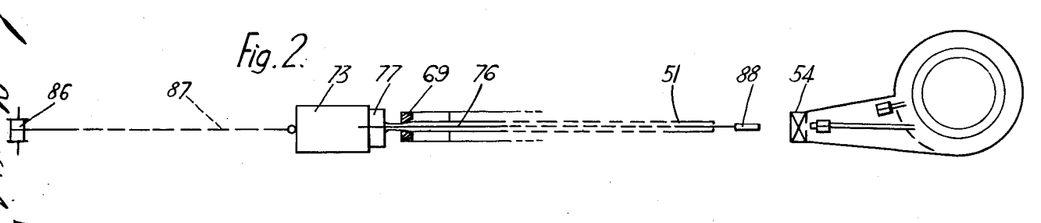

The method of sheathing and impregnating the cable is as follows. Referring to FIGURE 1, the drum 3 of core is placed in the drying vessel 5 and the cover 6 replaced, the ends of the core having had a short length of insulated tow-rope 28 connected to each end. The bared end of the outer tow rope is coupled to the plug 48 which is seated in the bore of the extension 47. The bared ends of both insulated tow ropes are held by the conductive clamps 31 and 32. The valve 54 is closed and the vacuum drying of the core is carried out. The die carriage 67 and the tow-line winch carriage 68 are positioned close to the drying vessel 5. The valve 77 on the winch housing is open and to the end of the tow-line 76 is attached a messenger 88. The aluminium pipe 51 is drawn from a drum 89. The messenger 88 is inserted into the pipe 51, the end of which is passed through the die 69 and connected to the valve 77 by the coupling. By means of the outer winch 86 and hawser 87 the winch housing is now drawn away from the drying vessel 5 to pull out the required length of pipe 51. The die-carriage 67 is allowed to be drawn along by the pipe 51 during these stages. The pipe 51 is drawn out until there is a working gap between its trailing end and the valve 54 on the drying vessel 5. By pressurising the interior of the tow-line winch housing 73, the messenger 88 is blown through the pipe and out at its trailing end so as to carry the tow line through the pipe 51. This is the situation represented in FIGURE 2.

Figure 3:
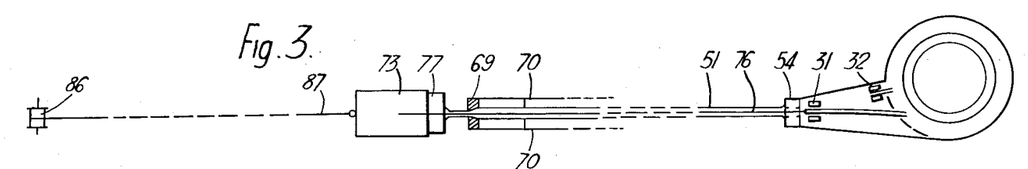
Figure 4:
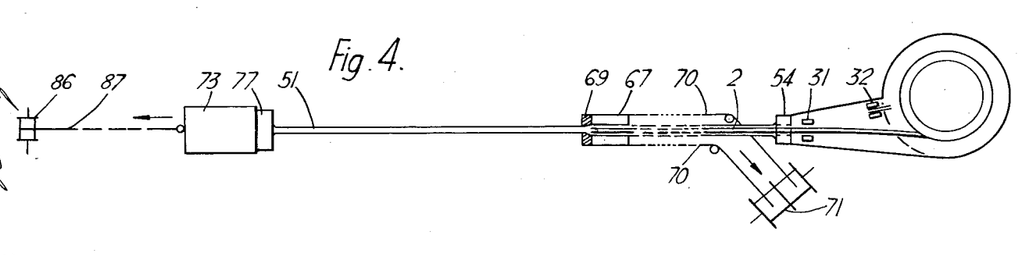

The messenger 88 is now removed from the end of the tow-line 76 and this end is fixed to the eye-bolt 64 on the tapered plug 48, the valve 54 being opened for this purpose and the clamps 30 and 31 also being released. The trailing end of the tube 51 is now drawn back and coupled to the valve 54 by the conical coupling members 62, 63. This is the insulation represented in FIGURE 3. Through the winch chamber 73 the pipe 51 is now evacuated. With the vacuum maintained in the drying vessel 5, pipe 51 and winch chamber 73, the winch 74 is set in operation to pull the plug 48 away from its tapered seating and thereupon to draw the core 2 into the length of pipe until the leading end of the core 2 is in the region of the die 69 and the insulated tow rope at the leading end extends into the winch-chamber 73 through the valve 77. FIGURE 11 illustrates the condition existing as this stage in the operation is being approached. During this operation the tension in the core 2 is controlled by the braking action of the hydraulic pump 10 connected to the drum-supporting table 4. It will be appreciated that when the pipe 51 is reduced in diameter by drawing it through the die 69, the length of the pipe will increase. Consequently the pipe 51 is made with an initial length which is shorter than the core length by the amount by which the length of the pipe will subsequently increase. Consequently when the leading end of the core has been pulled to the extreme forward end of the pipe, a portion of the trailing end of the core remains in the drying vessel. At this stage the tow-line winch 74 is stopped and the die carriage 67 is drawn towards the drying vessel 5 by means of the inner winch 71 and hawsers 70. The effect of this is to draw down the pipe 51 on to the core progressively from the leading end. At any instant the portion of the pipe which extends between the die 69 and the drying vessel 5 remains stationary. There is, however, a continuous forward movement of the remainder of the pipe, as its length increases due to its decreasing diameter. To accommodate this length increase, the tow-line winch chamber is drawn outwards by the outer winch 86. FIGURE 4 represents the condition while this stage of the process is in operation. Since the length of the core 2 remains unchanged, its trailing end is drawn into the pipe 21 as the die 69 moves towards the drying chamber. The length of the pipe is so selected that when the die 69 has reached the limit of its movement, the whole of the core 2 will have been pulled into the drawn-down pipe and the trailing tow rope attached to the trailing end of the core will extend out of the pipe and through the valve 77.

Both of the valves 54 and 77 are now closed so that they sever the insulated tow-ropes and also isolate the interior of the pipe, in a pressure-tight manner, from the interior of the winch housing and drying chamber. Impregnating fluid is now supplied to the interior of the pipe through the port 72 in the inner valve 54 and allowed to circulate through the pipe, escaping until impregnation is completed through the corresponding port 72 in the outer valve 77.

The leading or outer end of the sheathed core can now be disconnected from the outer valve 77 and this end of the sheath closed by means of an appropriate plug. The cable is now wound, from this end, on a take-up drum.

When the trailing end of the cable reaches the drum, with the valve 77 still connected to it, this valve can also be removed and the sheath closed by means of an appropriate plug.

In an alternative method and arrangement, to the bared end 30 of the leading insulated tow rope there is plumbed one end of a copper connecting rod 100. At its other end the rod 100 is bored and the bore is internally screw-threaded. During the main operation of drying under vacuum the drying vessel is sealed by closing the valve 54 as previously. The leading end of the tow line, which has been threaded through the metal pipe, is attached to an eye-bolt 101 on one end of a connector bar 102. The other end of the bar 102 is screw threaded 103 to engage within the internally threaded bore in the connecting rod 100. After the main drying operation, the vacuum in the drying vessel is broken by admitting to it dry air or gas. The valve 54 is now opened and the connector bar 102 is screwed into the connecting rod 100. The metal pipe 21, preferably after being filled with dry air or gas, is now coupled to the valve 54, the vacuum is reapplied and the process then proceeds in the manner already described.

What I claim as my invention is:

1. Apparatus for use in the manufacture of a metal sheathed oil-filled cable, comprising a drying vessel containing means for rotatably supporting a drum of cable core and having, in its peripheral wall, an opening extending the full width of the drum, an external hood closing the opening and having a relatively small mouth through which the core can be drawn out of the vessel and means provided at the mouth for making air-tight connection between the interior of the hood and one end of a metal tube laid out externally of the hood, an inner valve associated with the mouth of the hood for isolating the tube from the interior of the hood and for sealing said end of the tube, and, for the other end of the tube, means for drawing a tow-line out of the tube incorporating means for sealing the tube.

2. Apparatus as claimed in claim 1, in which said sealing means for said other end of the tube is a vacuum-tight container with means for making an air-tight connection between said other end of the tube and the interior of the container, and, within the container, a winch for the tow-line.

3. Apparatus for use in the manufacture of metal sheathed oil-filled cable, comprising a drying vessel containing means for rotatably supporting a drum of cable core and having in its peripheral wall an opening extending the full effective width of the drum, an external hood closing the opening and having a relatively small mouth through which the core can be drawn off the drum and out of the vessel, and means provided at the mouth of the hood for making an air-tight connection between the interior of the hood and one end of a metal tube laid out externally of the hood, the mouth having a bore tapering towards the interior of the vessel, a plug adapted to fit closely in the tapered bore and to be mechanically coupled to one end of a core in the tank and to one end of a tow-line outside the hood whereby, by means of the tow-line, the plug may be withdrawn to place the interior of the tube into communication with the interior of the vessel.

4. Apparatus for use in the manufacture of a metal sheathed oil-filled cable, comprising a drying vessel containing means for rotatably supporting a drum of cable core, an external hood closing an opening in the peripheral wall of the vessel and having a relatively small mouth through which the core may be drawn from the drum, means for making an air-tight coupling between the interior of the hood and one end of a length of metal tubing, a vacuum tight winch-housing having an aperture in its wall and with means at said aperture for making an air-tight connection between the interior of the winch-housing and the other end of the length of tubing, means for drawing the winch-housing away from the drying vessel for the purpose of laying out the length of tubing between the winch-housing and the vessel, a tow-line and arrangements for mechanically coupling one end of the tow-line to one end of the core, a winch in the housing for drawing the tow-line through the tubing to pull the core from the vessel into the tubing, and, between the winch-housing and the vessel, a sinking die with arrangements for moving the die towards the vessel to reduce the cross-section of the tubing.

References Cited in the file of this patent

UNITED STATES PATENTS

| | | |
|---|---|---|
| 1,009,731 | Fisher | Nov. 28, 1911 |
| 1,818,976 | Goff | Aug. 18, 1931 |
| 2,063,346 | Scott et al. | Dec. 8, 1936 |
| 2,155,980 | Reichelt | Apr. 25, 1939 |
| 2,390,823 | Bennett | Dec. 11, 1945 |
| 2,656,290 | Berberich et al. | Oct. 20, 1953 |
| 2,781,285 | White | Feb. 12, 1957 |
| 2,831,656 | Grieve | Apr. 22, 1958 |

FOREIGN PATENTS

| | | |
|---|---|---|
| 11,048 | Great Britain | June 29, 1891 |
| 76,816 | Sweden | Mar. 28, 1933 |